United States Patent [19]
Harris

[11] 3,731,174
[45] May 1, 1973

[54] CONDITION CONTROL DEVICE AND SYSTEM

[76] Inventor: John L. Harris, 470 Palm Island, N. E., Clearwater, Fla. 33515

[22] Filed: Aug. 24, 1972

[21] Appl. No.: 283,273

Related U.S. Application Data

[62] Division of Ser. No. 133,236, April 12, 1971.

[52] U.S. Cl. .................318/485, 307/141.4, 200/39
[51] Int. Cl. ............................................G05g 21/00
[58] Field of Search......................318/484, 485, 487; 307/141.4, 141.8; 200/39

[56] References Cited

UNITED STATES PATENTS

| | | | |
|---|---|---|---|
| 3,100,823 | 8/1963 | Wagner | 200/39 |
| 3,248,632 | 4/1966 | Bowman | 318/486 X |
| 3,599,006 | 8/1971 | Harris | 200/39 R |

*Primary Examiner*—Benjamin Dobeck

[57] ABSTRACT

A timing device controls a group of electric heaters, turning them on in sequence in response to call for heat by a thermostat and turning them off in sequence when the call for heat is satisfied. The timer has two stopping points, one with the heaters off and the other with the heaters on. A single switch controls the timer motor and is opened by a timer cam at the off and on positions. The switch is held open at the off position by an off latch and at the on position by an on latch. These latches are released by a solenoid controlled by the room thermostat. The latches are also controlled by a timer cam, the off latch being held released when the timer is in the on position, and the on latch being held out at the off position. The load switches for the heaters are also opened instantly by a second solenoid responding to an unfavorable condition. This same action releases the on latch to cause the timer to return to the off position.

4 Claims, 6 Drawing Figures

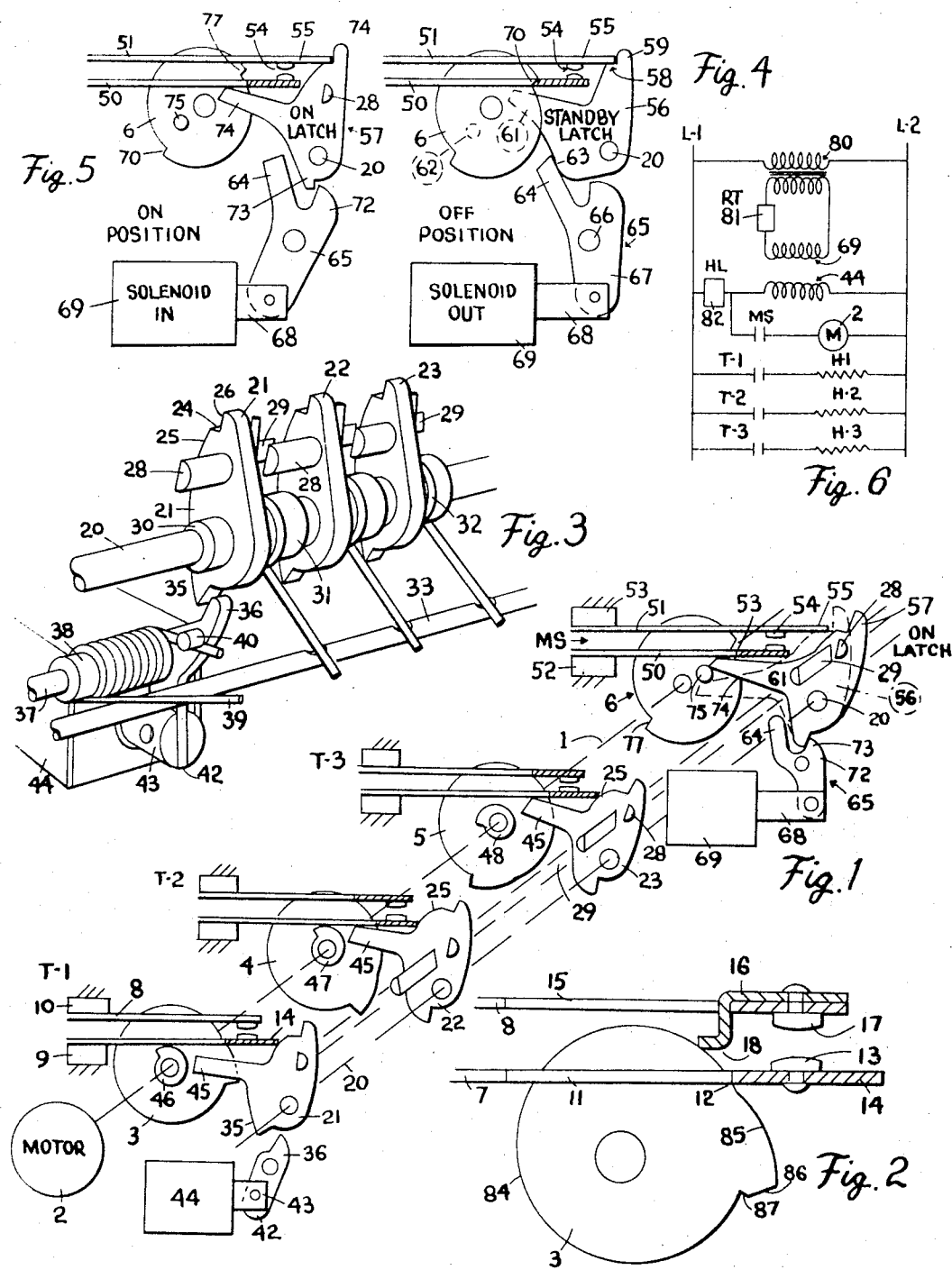

3,731,174

CONDITION CONTROL DEVICE AND SYSTEM

CROSS REFERENCE TO COPENDING APPLICATION

This application is a division of my application Ser. No. 133,236 filed Apr. 12, 1971.

BACKGROUND OF INVENTION

This invention relates to automatic controls and more particularly to sequence timer controls for turning on and off individual heater banks of an electric heating system. In the domestic electric heating field it has become common to use a number of heater banks of approximately 5KW each, all controlled by a single on-off thermostat. If all the banks were turned on or off at the same time, excessive surges in the power line would result. Power companies require a time delay between turning on each heater bank and also between turning off each heater bank.

In the applicant's copending application a single cam operated timer is controlled by a thermostat having a single contact. On closure of this contact the timer motor drives the timer through a half cycle turning on the heaters. When the thermostat contacts open, the timer motor is again energized and drives the timer another half cycle, turning off the heaters. In applicant's prior device the timer motor is stopped in the on position by shunting the power source through the thermostat contacts. This works well with a leakage transformer which can be shunted without damage. However it precludes the use of the transformer for other functions which is objectionable in some applications.

BRIEF SUMMARY OF INVENTION

The primary object of the invention is to provide a simple switching arrangement for starting and stopping the motor of a sequence timer to cause the timer to cycle between two predetermined positions under the command of a single contact thermostat.

A further object is to provide such a switch which will close and drive the timer back to the off position in the event of a malfunction.

In applicant's device, the motor switch consists of two switch blades operated by a cam on the same shaft operating the load switches. The inner blade rides the cam and the outer blade is controlled by two separate latches. In operation, the cam lifts the inner blade which in turn lifts the outer blade through the contacts which are engaged. One of the latches comes into place for holding the outer blade and the cam then drops the inner blade. This separates the contacts. Releasing the latch allows the outer blade to drop, engaging the contacts, thus overriding the action of the cam.

The two latches are operated by a thermostat controlled solenoid through a double acting lever or master control means. One latch (off) is released when the solenoid pulls in for starting the sequence timer from the off position. The switch is now maintained closed until the timer reaches the on position where it is held open by the run latch. This latch is released by the solenoid dropping out to drive the timer back to the off position.

Another object of the invention is to provide for motor control by a single switch or control means, this switch being opened at two positions of the device being driven, and the opening of the switch being overridden by a master controller for causing the device to be driven from one position to the other.

Another object of the invention is to insure that the latches or overriding control members do not interfere with proper operation of the motor control switch. This is achieved by mechanically blocking out the off latch when the timer is at the on position, and blocking out the on latch when the timer is in the off position.

A further object of the invention is to cause the timer to return to the starting position in event of a power failure or other malfunction. This is achieved by use of a second solenoid which opens the load switches instantly, and which also releases the on latch.

Other objects will appear from the following detailed description and appended claims.

BRIEF DESCRIPTION OF DRAWINGS

FIG. 1 is a schematic representation of a multiple cam operated timer embodying the invention.

FIG. 2 is an enlarged view showing the details of the load switches.

FIG. 3 is a perspective view showing the arrangement of the load switch latches.

FIG. 4 is a fragmentary view of the timer motor switch when the timer is at its off position.

FIG. 5 is a view similar to FIG. 4 but showing the positions of the parts when the timer is at its on position.

FIG. 6 is a schematic wiring diagram of a typical electric heating system embodying the invention.

DETAILED DESCRIPTION OF THE INVENTION

Referring to FIG. 1 reference character 1 indicates a cam shaft which is illustrated schematically. This cam shaft is driven in a clockwise direction by a timer motor 2 and carries load switch cams 3, 4, and 5 which operate load switches T1, T2, and T3, respectively. The cam shaft 1 also carries a cam 6 which operates a timer motor switch MS.

Referring to switch T1 this switch includes two flexible switch blades 7 and 8 mounted at the left hand ends on fixed supports schematically illustrated as 9 and 10. Both switch blades are biased toward the cam 3 and straddle the cam. As shown more clearly in FIG. 2, the lower switch blade 7 is provided with a slot 11 through which the cam 3 extends. The switch blade 11 also includes a cam follower surface 12 which rides the outer edge of cam 3. The blade 7 also carries a contact 13 and includes an extension 14 which extends beyond the contact. The upper blade 8 is slotted as at 15 and is provided with a cam follower bracket 16. This switch blade carries a contact 17 which also serves to secure the bracket 16 to the blade. The bracket 16 has a downwardly extending portion and is formed to provide a cam follower surface 18 which also rides the cam 3.

Referring again to FIG. 1, reference character 20 indicates a latch shaft which is shown schematically and which carries latches 21, 22, and 23 associated with the switches T1, Ts, and T3 respectively. These latches are identical. As shown more clearly in FIG. 3, each latch includes an upper latching surface 24 and a drop-off sloping portion 25. The latch also includes an upwardly extending portion 26 adjacent the latching surface which acts as a stop for limiting rotation of the latch in a counterclockwise direction about its pivot on the latch shaft 20. Preferably the latches are of molded construction of a suitable insulating material such as polycarbonate. An extension 28 extends from the left hand side of the latch as seen in FIG. 3. This extension 28 provides a driven surface. A similar extension 29 extends from the right hand side of the latch into overlapping relationship with the driven extension 28 on latch 22. The purpose of the driving and driven extensions on the latches will appear later in this description.

Each latch is also molded with hub portions 30 and 31 which serve as bearings on the latch shaft 20 and also serve as spacers between the latches. Each latch is provided with a biasing spring 32 of the torsion type, one leg bearing on the extensions 29 and the other leg bearing on a spring shaft 33 which extends parallel with the latch shaft 20. It will now be apparent that the latches 21, 22, and 23 are individually pivoted on the latch shaft 20 and also are individually biased toward the respective switches.

The latch 21 is also formed with a downwardly extending lever portion 35 which is engageable by a solenoid lever 36 which is pivoted on a shaft 37. As shown in FIG. 3 the solenoid lever 36 includes a hub portion 38 carrying a torsion spring 39. One end of the torsion spring engages a boss 40 formed on the solenoid lever. The other end rests on the spring shaft 33. The torsion spring 39 therefore biases the lever 36 in a counterclockwise direction about its pivot 37. The solenoid lever 36 also includes a downwardly extending portion 42 which extends into the plunger 43 of solenoid 44.

The load switch latches 21, 22, and 23 have inwardly extending leg portions 45 extending toward the camshaft 1. These extensions are arranged so as to be actuated by "off" cams 46, 47, and 48 which are mounted adjacent the "on" cams 3, 4, and 5 respectively.

The timer motor control switch MS includes an inner switch blade 50 and an outer switch blade 51, these blades being suitably anchored at their left hand ends at 52 and 53 respectively. The lower switch blade 50 straddles the motor switch cam 6 and is provided with a cam follower surface 53 which rides the cam 6. The upper switch blade 51 also straddles the cam. However this blade does not ever ride on the cam and is lifted away from the cam solely by engagement of the contacts 54 carried by the switch blades. The upper switch blade 51 also includes an extending portion 55 which is adapted to be engaged and held up by either the standby latch 56 or the on latch 57. The latches 56 and 57 are mounted side by side on the latch shaft 20 and are provided with suitable biasing springs (not shown) which bias the latches individually toward the extension 55 of switch blade 51.

Referring to FIG. 4 the standby latch 56 includes a latching surface 58 and a stop extension 59 which engages the end of extension 55 of blade 51 thus limiting its counterclockwise rotation under the effect of its biasing spring (not shown). The latch 56 also includes an inwardly extending lever portion 61 which extends toward the camshaft 1 alongside the cam 6. This extension 61 is adapted to be engaged by a lug 62 formed on the cam 6. The latch 56 also includes a camming surface 63 which is engageable by an arm 64 of solenoid lever 65. This solenoid lever 65 is pivoted on a bearing 66 and is biased in a counterclockwise direction by a spring (not shown). This lever includes a downwardly depending portion 67 which is attached to the plunger 68 of solenoid 69. In FIG. 4 the solenoid is shown in its deenergized position in which the plunger 68 is retracted allowing the solenoid lever 65 to rotate to its counterclockwise limit of rotation under the action of its biasing spring. This position of the solenoid lever 65 has retracted the lever portion 64 so that the latch 56 is engaged for supporting the end of the switch blade 51. FIG. 4 shows the cam 6 in the position where the lower blade 50 has just been dropped by the notch 70 of cam 6. With this position of the parts the contacts 54 are disengaged.

FIG. 5 shows switch MS in open position under the control of the on latch 57. In this case the solenoid 69 is in its energized position and the solenoid lever 65 is thus rotated to its clockwise limit of rotation. In this position of the solenoid lever, the extension 72 of this lever is clear of downward extension 73 on latch 57. This has allowed latch 57 to rotate to its latching position in which latching surface 74 is holding up extension 55 of switch blade 51. It should be noted that the latch 57 is shaped so that it is not contacted by the extension 64 on the solenoid lever. The latch 57 has an inwardly extending arm 74 which extends alongside the cam 6 and is in the path of a lug 75 carried by the cam 6. With the parts in the positions shown in FIG. 5, the lower switch blade 50 has just dropped off section 77 of the cam and the contacts 54 are disengaged.

FIG. 6 shows a typical wiring diagram of an electric heating system embodying the invention. A transformer 80 has its primary connected across the line wires L1 and L2. The secondary supplies low voltage power to the solenoid 69 in series with a room thermostat 81. The room thermostat thus energizes or deenergizes the solenoid 69. The solenoid 44 is connected across line wires L1 and L2 in series with a high limit control 82. This high limit control is normally closed but opens in the event of overheating of the electrical heating apparatus. The motor switch MS is preferably connected in series with the high limit control 82 and controls power to the timer motor 2. The load switches T1, T2, and T3 control power to the electrical heater banks H1, H2, and H3 respectively.

OPERATION

FIG. 1 shows the positions of the parts when the room thermostat 81 is satisfied and when the system is in normal operating condition. The room thermostat solenoid 69 is deenergized and the solenoid lever 65 is thus rotated to its counterclockwise limit. This has allowed the standby latch 56 to come into place as shown in FIG. 4 thus opening the timer motor switch MS. The on latch 56 is held in disengaged position by the arm 72 of the solenoid lever bearing against the downward extension 73 of the on latch. The on latch 57 is also held in released position due to the inward extension 74 now being contacted by the abutment 75 carried by cam 6. It will be noted that the latches 21, 22, and 23 are all in released position and the load switches T1, T2, and T3 are all open. The extension 14 on each of the load switch blades 7 are now bearing on the cam surfaces 25 of the load switch latches. The driving extension 29 of the load switch latch 23 is now in place for engagement with the driven extension 28 on the on latch 57 for preventing this latch from moving into engaging position.

Summarizing when the parts are in the standby position, all of the load switches are open, the motor switch MS is held open by the standby latch 56 and the run latch 57 is held in unlatched position by three independent means. One is the solenoid lever 65 being in its deenergized position. The second is by the extension 74 being engaged by abutment 75 on cam 6. The third is by the driven extension 28 being held out by the driving extension 29 on latch 23.

In normal operation the apparatus is not overheated and the high limit control 82 is closed energizing the solenoid 44. This rotates the solenoid lever 36 so that it is clear of downward extension 35 on the latch 21. The latch 21 is therefore in condition for moving into latching engagement. When the room thermostat 81 calls for heat it energizes the solenoid 69 and the solenoid lever 65 assumes the position shown in FIG. 5. During this motion the extension 64 on this lever engaged the camming surface 63 on the standby latch 56 and rotated this latch clockwise to releasing position. This allowed the upper blade 51 to drop, engaging contacts 54 of the motor switch and energizing the timer motor 2. The motor now drives the camshaft 1 in a counterclockwise direction thus rotating cams 3, 4, 5, and 6 in this same direction. At the start of the cycle as shown in FIG. 2, the cam follower portions 12 and 18 of switch blades 7 and 8 are riding on the generally circular portion 84 of the cam 3. As the cam rotates counterclockwise the rise portion 85 of the cam comes into engagement with the two cam follower surfaces and lifts the blades with contacts 17 and 18 disengaged. As the cam follower portion 12 of blade 7 approaches the top of the cam rise 85, the extension 14 on switch blade 7 clears the latching surface 24 of latch 21. This latch now is rotated by its biasing spring into latching engagement in which the stop portion 26 of the latch engages the end of blade 7. On continued rotation of the cam, the cam follower portion 12 of blade 7 rides down the inclined portion 86 of the cam until it rests against the latching surface 24 of the latch. On further rotation of the cam the follower portion 18 rides down the sloping portion 86 of the cam and finally drops off at 87. As the lower blade 7 is now supported by the latch, contact 17 engages contact 13 before the follower portion 81 touches the generally circular portion 84 of the cam. Summarizing as the cam 7 is rotated counterclockwise it lifts both blades of the switch with the contacts separated. The latch 21 moves into position for supporting the lower switch blade and then both blades are lowered causing the contacts to engage. The contacts are now engaged due to the latch 21 being in latching position.

As the cam shaft continues to rotate switches T2 and T3 are closed in sequence in the same manner.

As the timer continues to rotate, the abutment 62 on the cam 6 comes into engagement with the extension 61 of the standby latch 56 and holds this latch disengaged independently of the extension 64 on the solenoid lever 65. The lower switch blade 50 of the motor switch MS is lifted by cam 6 and this in turn lifts the upper blade 51 so that its extension clears the latching surface 74 on the run latch 57. As the solenoid 69 is now energized, the lever 65 is rotated to be free of the downward extension 73 on latch 57. The latch is thus free to move into latching position under the extension 55. When the drop-off section 77 of the cam rides under the cam follower portion of blade 50, this blade drops to the lower surface of the cam and the contacts 54 disengage thus stopping the motor 2 with load switches T1, T2, and T3 all closed and with heaters H1, H2, and H3 therefore energized.

When the room thermostat 82 becomes satisfied, it deenergizes solenoid 69 thus rocking the solenoid lever 65 counterclockwise. The extension 72 of the lever now engages portion 73 of the latch 57 and rotates the latch clockwise into releasing position. This drops the upper switch blade 51 reclosing contacts 54 and thus energizing the timer motor 2. The timer motor 2 now drives the cam shaft 1 in a counterclockwise direction until the cam 48 associated with cam 5 of switch T3 engages the extension 45 on latch 23. This releases the latch 23 allowing the switch blades to reassume the positions shown in FIG. 2 with the contacts disengaged thus deenergizing heater bank H3. On continued rotation of the cam shaft 1, cam 47 associated with cam 4 of switch T2 releases latch 22 thus opening switch T2 and deenergizing the heater bank H2. Later cam 46 associated with cam 3 releases latch 21 thus opening switch T1 and deenergizing heater bank H1. The timer motor continues to rotate the cam shaft 1 in a counterclockwise direction causing the cam 6 to rotate back to the position shown in FIG. 4. As the cam shaft approaches this position, the abutment 75 on cam 6 comes into engagement with the extension 74 on latch 57 and holds this latch disengaged independently of the solenoid lever 65. Also as the cam shaft assumes a position of FIG. 4, the lower switch blade 50 is lifted until the extension 55 on switch blade 51 clears latch 56. This latch now moves into place which it is now free to do, due to the cam abutment 62 having been moved out of the way and also due to the solenoid 69 now being deenergized. When the drop-off section 70 passes under the cam follower portion of blade 50, this blade drops and contacts 54 are now open due to the extension 55 now resting on the latching surface 58 of latch 56.

Summarizing, when the room thermostat 81 becomes satisfied it opens the circuit for the solenoid 69. This solenoid drops out releasing the on latch and closing switch MS starting the timer motor. The timer now runs opening switches T3, T2, and T1 thus deenergizing the heaters in sequence. As the timer approaches the standby position, the on latch becomes held in released position independently of the solenoid 69, and the latch 56 comes back into latching position. When the timer reaches the standby position, the lower switch blade drops off the cam notch and opens the contacts thus stopping the timer motor with the timer in the off position.

From the foregoing it will be apparent that the cam shaft or control element 1 is driven by the motor from the off position to the on position and back to the off position, the motor being maintained in operation between these positions by the switch or controller MS. It will also be apparent that the cam or stop means 6 serves to mechanically open the switch when the cam shaft reaches either its run position or its off position. Also the solenoid lever 65 acting through the on latch or the standby latch serves to reclose the switch thus overriding the action of the cam in opening the switch.

As long as the high limit control 82 is closed, the solenoid 44 is energized and the solenoid lever 36 does not interfere with operation of the load switch latches. If the timer is in the on position with the load switches closed and with the motor switch MS opened, and overheating occurs, the limit control 82 will drop out the solenoid 44. The solenoid lever 36 will engage with portion 35 of latch 21 and release this latch opening switch T1. As latch 21 releases, the extension 14 on blade 9 rides down the camming surface 25 of the latch, forcing it in a clockwise direction. The driving extension 29 on this latch now engages the driven extension 28 on the latch 22 and releases latch 22. The camming motion of the switch blade on latch 22 rotates this latch which in turn acts through the driving and driven surfaces to release latch 23 opening switch T3. This in turn causes the driving extension 29 on latch 23 to engage the driven extension 28 on latch 57 and thus release latch 57. This recloses the motor switch MS and causes the timer to drive back to the standby position when the high limit switch 82 recloses. When the timer reaches the standby position it will continue to run and reclose the load switches in sequence if the thermostat 81 is still calling for heat. If this is the case, the solenoid 69 will be energized and will thus keep the standby latch released.

Summarizing if the high limit control opens when the timer is in the run position, it drops out the solenoid which opens the load switches and recloses the motor switch simultaneously. When the high limit control recloses, the timer runs back to the starting position and recloses the load switches in sequence. The same action occurs on a power interruption. The timer will open any load switches which are then closed and will run back to the starting point and reclose the switches in sequence when power is returned.

While the invention has been shown as applied to a multiple switch sequence timer it will be apparent that it is equally applicable to other types of devices in which a control member is moveable between two predetermined positions under the control of a master controller. Also as many modifications may be made in the structure disclosed without departing from the spirit and scope of the invention it is desired to be limited only by the scope of the appended claims.

I claim:

1. In a condition changing system having a plurality of condition changers, a cam shaft, load switches actuated in sequence by the cam shaft and connected to said condition changers, a motor arranged to drive said cam shaft, said cam shaft having a standby position in which the condition changers are off and a run position in which the condition changers are on, the condition changers being energized in sequence as the cam shaft is driven from the standby position to the run position, and being deenergized in sequence as the cam shaft is driven from the run position to the standby position, a switch connected to the motor, operating means for the switch arranged to maintain the motor in operation when the cam shaft is between the run and standby positions and to stop the motor when the cam shaft is either in the run or standby positions, said operating means including cam means on the shaft for opening the switch at the standby position and at the run position, a standby latch for holding the switch open in the standby position, a run latch for holding the switch open in the run position, an electro-magnet arranged to selectively release one or the other of said latches, and a condition responsive device arranged to control said electro-magnet.

2. A control system as defined in claim 1 in which means on the cam shaft holds the run latch released when the shaft is in the standby position and holds the standby latch in released position when the shaft is in the run position.

3. A control system as defined in claim 1 having a second electro-magnet arranged to actuate the load switches simultaneously for stopping the condition changers in response to an unfavorable condition, said second electro-magnet also being arranged to release the run latch for causing the cam shaft to be driven back to the standby position.

4. In a control system for a power operated device, the combination of, a power source for energizing said device, a load switch for controlling the power to said device, a timer motor, means including a single throw type timer motor switch for stopping and starting the timer motor, an electro-magnet arranged to mechanically operate said timer motor switch, closing the same upon movement of the electro-magnet in one direction, control means connected to the electro-magnet for controlling the same and arranged to selectively energize and deenergize said electro-magnet, causing it to move in said one direction or the opposite direction, said timer motor switch and timer motor being connected across a source of power independently of said control means thereby causing operation of the timer motor at any time when the timer motor switch is closed, independently of said control means, means operated by the timer motor for causing closure of the load switch after a predetermined closure of the timer motor switch, means opening the timer motor switch to stop the timer motor after closure of the load switch, means operated by movement of the electro-magnet in said opposite direction for reclosing said timer motor switch, and means operated by the timer motor for reopening the timer motor switch after a period of time of closure thereof.

* * * * *